United States Patent
Dahl et al.

(10) Patent No.: US 8,712,444 B2
(45) Date of Patent: Apr. 29, 2014

(54) SIGNAL PHASE-BASED LOCATION OF NETWORK NODES

(75) Inventors: Paul A. Dahl, Pleasant Grove, UT (US); Scott McCall, Provo, UT (US)

(73) Assignee: Digi International Inc., Minnetonka, MN (US)

(*) Notice: Subject to any disclaimer, the term of this patent is extended or adjusted under 35 U.S.C. 154(b) by 397 days.

(21) Appl. No.: 12/774,862

(22) Filed: May 6, 2010

(65) Prior Publication Data

US 2011/0273991 A1    Nov. 10, 2011

(51) Int. Cl.
*G01S 5/12* (2006.01)
*G01S 5/08* (2006.01)
*H04W 84/18* (2009.01)
*G01S 5/02* (2010.01)
*H04W 64/00* (2009.01)
*G01S 5/10* (2006.01)
*G01S 5/04* (2006.01)

(52) U.S. Cl.
CPC ........... *G01S 5/0289* (2013.01); *G01S 5/10* (2013.01); *G01S 5/04* (2013.01); *H04W 64/00* (2013.01); *H04W 84/18* (2013.01)
USPC ........................................ 455/456.5; 342/450

(58) Field of Classification Search
USPC ............................................ 455/456.1–456.5
See application file for complete search history.

(56) References Cited

U.S. PATENT DOCUMENTS

| 3,714,650 | A | | 1/1973 | Fuller et al. | |
| 3,860,921 | A | * | 1/1975 | Fletcher et al. | 342/109 |
| 6,574,478 | B1 | * | 6/2003 | Mortensen | 455/456.5 |
| 8,102,784 | B1 | * | 1/2012 | Lemkin et al. | 370/255 |
| 2005/0233748 | A1 | * | 10/2005 | Robinson et al. | 455/440 |
| 2008/0232297 | A1 | | 9/2008 | Mizugaki et al. | |
| 2010/0141529 | A1 | * | 6/2010 | Allam et al. | 342/387 |
| 2010/0246438 | A1 | * | 9/2010 | Potkonjak | 370/254 |

FOREIGN PATENT DOCUMENTS

EP    0242983    A2    10/1987

OTHER PUBLICATIONS

Bensky, "Wireless Positioning Technologies and Applications", chapter 5, published in 2007.*
Monraru et al., "Real Time Location System, Case Study: ZigBee", published on Jun. 17, 2009.*
Priyantha et al., "Anchor-Free Distributed Localization in Sensor Networks", MIT LCS Tech Report #892, published on Apr. 8, 2003.*
Internatonal Application Serial No. PCT/US2011/035307, International Search Report mailed Aug. 19, 2011, 3 pgs.
Internatonal Application Serial No. PCT/US2011/035307, Written Opinion mailed Aug. 19, 2011, 7 pgs.

* cited by examiner

*Primary Examiner* — Asad Nawaz
*Assistant Examiner* — Zhaohui Yang
(74) *Attorney, Agent, or Firm* — Fogg & Powers LLC

(57) ABSTRACT

The physical position of a movable node in a network is determined by sending a first signal from a first reference node to at least a second reference node and the unknown node. The unknown node receives the first signal and sends a second signal to at least the second reference node in phase with the first signal. The first signal and the second signal are received in the second reference node and the phase of the received signals is compared to determine the position of the unknown node based on the phase difference between the received first and second signals.

10 Claims, 2 Drawing Sheets

201 — $A = (d_1 + d_2) - (d_1 + d_3) = d_2 - d_3$
202 — $B = (d_1 + d_2 + d_3) - d_1 = d_2 + d_3$
203 — $D = d_1 + d_2$
therefore
204 — $d_2 = B - d_3 = A + d_3$
205 — $d_2 = 1/2 (B + A)$

SIGNAL PHASE-BASED LOCATION OF NETWORK NODES

FIELD OF THE INVENTION

The invention relates generally to wireless networks, and more specifically in one embodiment to locating mobile wireless mesh network nodes.

BACKGROUND

Although computer networks have become relatively common both in office and in home networking environments, such networks are typically fairly sophisticated and require significant processing power, electrical power, and infrastructure to work well. Some networking applications do not require so robust a network environment, but can benefit from the ability to provide electronic communications between devices.

One such example is the Bluetooth technology that enables a cell phone user to associate and use an earpiece in what is sometimes referred to a personal area network or PAN. Another example is a mesh network, in which a number of devices work together to form a mesh, such that data can be sent from a source device to a destination device via other devices in the mesh network.

Mesh networks often include multiple links from a network node to other network nodes nearby, and can thereby provide routing around broken links or paths by discovering other routes through the mesh to a destination node. New nodes to a mesh network are typically able to automatically discover the mesh network when they are activated in the vicinity of a compatible mesh network, and can easily join the network.

Mesh networks are often made up of network nodes that are not mobile, and so link quality and reliability is relatively slow to change. Most applications of mesh networks rely on radio frequency communications to transfer data between network nodes, as running cables between nodes defeats somewhat the intended ease of installation and use of mesh network devices.

Mesh network device installations often have multiple networks deployed in remote locations, and are managed from a central location or server. The central location computer might have knowledge of what devices are within each of the mesh networks under management, but typically does not have direct access to the network nodes or knowledge of the location of each node in the network. For example, a mesh network controller might monitor an array of network nodes attached to various tools or production equipment in a facility and know the location of some fixed nodes in the facility, but will not know the location of other, mobile nodes in the network.

There exists a need to provide network technology that addresses factors such as management of wireless network nodes.

SUMMARY

One example embodiment of the invention comprises determining the physical position of a movable node in a wireless network by sending a first signal from a first reference node to at least a second reference node and the unknown node. The unknown node receives the first signal and sends a second signal to at least the second reference node in phase with the first signal. The first signal and the second signal are received in the second reference node and the phase of the received signals is compared to determine the position of the unknown node based on the phase difference between the received first and second signals.

DETAILED DESCRIPTION

Figure 1:
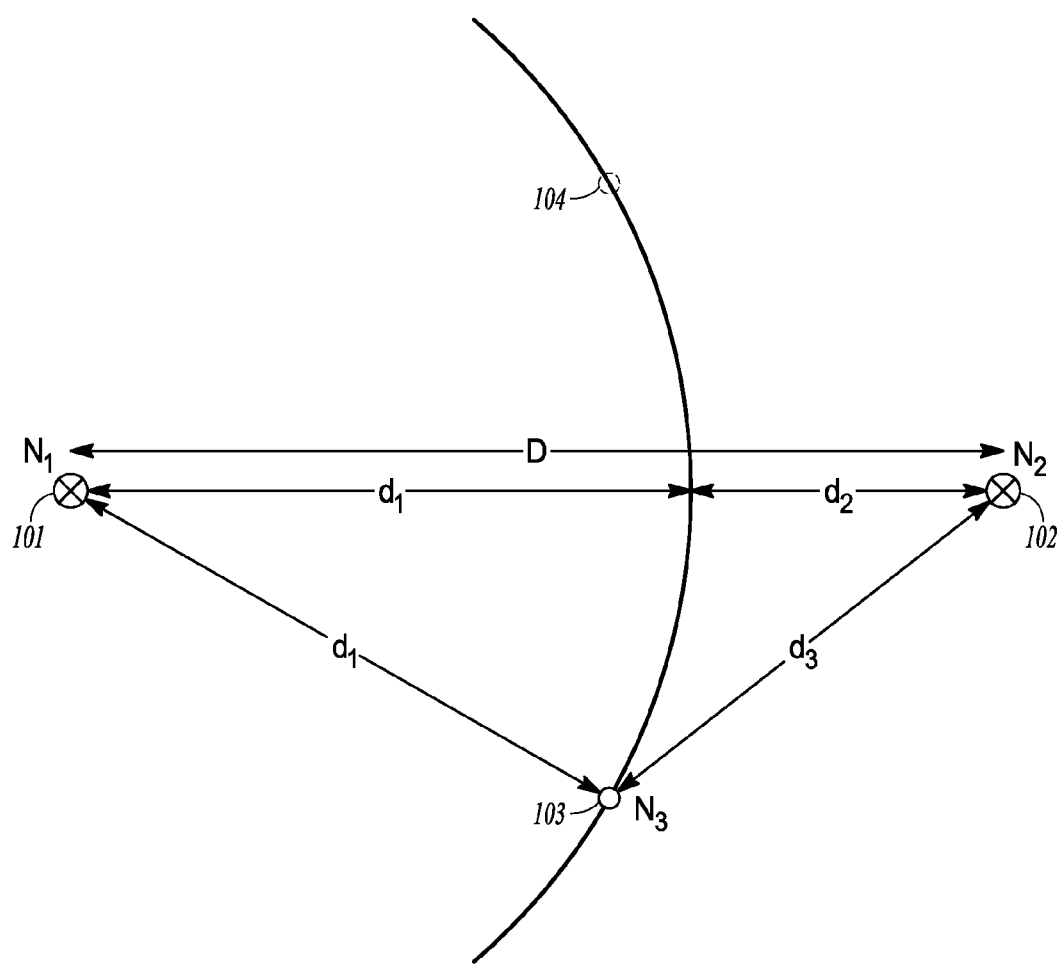
FIG. 1 shows an example radio frequency mesh network comprising two reference nodes and a node having an unknown location, consistent with an example embodiment of the invention.

In the following detailed description of example embodiments of the invention, reference is made to specific examples by way of drawings and illustrations. These examples are described in sufficient detail to enable those skilled in the art to practice the invention, and serve to illustrate how the invention may be applied to various purposes or embodiments. Other embodiments of the invention exist and are within the scope of the invention, and logical, mechanical, electrical, and other changes may be made without departing from the subject or scope of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

Many wireless networks such as mesh networks are often used to route data between various elements or nodes in a network made up of a number of loosely assembled nodes. Mesh networks are designed such that a compatible node can easily join the network and receive and send data, including passing received data along a route to an intended destination node. Mesh networks are therefore considered self-arranging and self-healing, in that if a node becomes inoperable or loses a connection to another node, data can be easily routed around the broken network link.

Many mesh network technologies use wireless communication, further enhancing the ease of use of mesh networking for certain applications. Because deployed mesh network nodes are typically stationary for some period of time, wireless connections between various nodes can be formed and characterized by searching a known frequency or radio band for other mesh network nodes as new wireless nodes are added to the mesh network. Recent reductions in cost and advancement in wireless networking technology has made use of mesh networking for a variety of applications a desirable alternative to using a more structured network such as a TCP/IP network or other type of network.

One example of a mesh network standard using wireless radio communication is the ZigBee mesh network, which was developed by an industry alliance and is related to IEEE standards including 802.15.4. The retail price of ZigBee-compliant transceivers is nearly a dollar, and a transceiver, memory, and processor can be bought for a few dollars in quantity, making integration of mesh network technology into inexpensive electronic devices a practical option. The standard is intended to support low power consumption at reasonably low data rates, and provides a self-organizing network technology that works well for applications such as control, monitoring, sensing, and home automation.

In this example of wireless mesh technology, one node operates as a coordinator, forming the root of the mesh network and performing other functions such as bridging to other networks and handling encryption keys. Most nodes are router nodes, which can receive and send data, including passing data along to other nodes. In some embodiments, end device nodes contain just enough functionality to receive and send data, but cannot route or pass data from a sending node to a different receiving node. While this preserves battery life and reduces the cost of the node, end device nodes are unable to contribute to the routing functions of the mesh network, and so will typically not make up a large percentage of a mesh network's nodes.

Although various nodes in the mesh network can communicate with other nodes using the node ID of the destination node, they do so in a different way than TCP/IP or many other network types. Each node in a ZigBee network sends a regular link status message, enabling its neighbor nodes to record the neighboring node as a neighbor, along with other information such as the link quality or signal strength. The paths within the network are managed within the individual router nodes that make up the bulk of the network, which maintain routing information regarding their links directly to other nodes but do not contain full routing capability. For example, a ZigBee node may know that to forward a message to node 134 it should send the message to its neighboring node 37, but it does not know the route the message takes from node 37 to 134.

ZigBee primarily uses technology known as Ad-hoc On-demand Distance Vector (AODV) to automatically construct an ad-hoc network by use of a route discovery process. An originating node broadcasts a route request command, which keeps track of its source, and other characteristics such as the number of nodes traversed and link quality between nodes as it progresses through the network. The destination node receives one or more copies of the broadcast request, and sends back a reply indicating which of the one or more routes discovered to use based on factors such as the number of hops and link quality between nodes. Each of the intermediate nodes maintains a list of immediate neighbor nodes to use for various destination nodes, but does not maintain a complete route.

ZigBee also includes many-to-one routing and source routing in some embodiments (e.g. ZigBee PRO) in which aggregator nodes are used to collect regular messages from multiple other nodes, such as where an aggregator is a gateway node in a sensor network. Source routing allows the aggregator to store complete routes to several other nodes in the network, where the route is determined by an aggregator node broadcast message and reply process. Sending a message to an aggregator using such a stored broadcast message path rather than route discovery is often known as "many-to-one" routing.

Because ZigBee nodes are not given traditional network addresses such as in a TCP/IP network, and routing within the ZigBee network is different than in an IP network, it is difficult for an outside network such as a TCP/IP, SMS, or other network to directly communicate with a specific node in a mesh network. Although adding a new node to such a network and routing to the new node is relatively straightforward, as explained above, identification of the node's position relative to other fixed nodes is somewhat more difficult.

Only the new node knows who all of its neighbors are and their relative signal strengths, enabling a crude approximation of position. But, signals can be attenuated or amplified by presence of metal objects in the area, such as in a warehouse environment, making such position determination using signal strength suspect. Because mesh networks are often used in monitoring or tracking applications where the physical location of a node is important, it is often desirable to be able to determine the physical position of a new or mobile node in such a wireless network environment.

Some solutions to network node position determination include using GPS (Global Positioning System) receivers in the nodes, such that the GPS receiver can provide the node with its location. This significantly raises the cost and complexity of the node, as a GPS receiver must then be added to each such node, and the node must be able to receive strong enough GPS signals to make a position determination. Other systems use a common timebase and methods of triangulation or trilateration, but require a significant number of messages be passed from the mobile node to determine time of flight to at least three other nodes with known positions.

One example embodiment of the invention therefore provides a system and method for using a single broadcast timing signal from a first reference node, and a second fixed node that receives the timing signal from the first node and from a node of unknown position. The unknown node repeats the timing signal from the first node in phase with and at the same frequency as the first node, enabling the second node to determine the unknown node's position to one of two points on a plane, such as a factory floor. Repeating the process with a third fixed node enables location of the unknown node to one of two points in another plane, enabling three dimensional determination of the unknown node's position.

A more detailed example is presented in FIG. 1, which illustrates a first node 101 and a second node 102 having known positions. A third node 103 is within radio range of both nodes 101 and 102, but its position is not known. Although node 3 is shown as being along an arc that runs between nodes 101 and 102, the node may be beyond one of the nodes in a further embodiment such that one of the nodes with known position is further away from the unknown node than from the other node with a known position.

In this example, the distances d1 and d2 are unknown, but the distance between nodes 101 and 102 is known to be D. We therefore know that D=d1+d2. The distance d3 is similarly unknown, and these distances d1, d2, and d3 are determined to find the location of unknown node N3 as shown at 103.

At least one of the nodes having a known location, 101 and 102, broadcasts a signal such as a burst location signal. In a more detailed embodiment, the burst location signal is a burst signal that includes signals at three different frequencies relatively near one another, and for a long enough period that nodes N2 at 102 and N3 at 103 can receive the signals and track the phase and frequency such as by using the received signals to drive a phase locked loop or by another suitable method at three distinct frequencies. The received signals in a further example are frequency filtered so that the phase of three distinct signals at three different frequencies can be tracked independently.

The broadcast signal is here first received by the nearer node 103, which synchronizes in phase and frequency with the signal received and broadcasts its own signal in phase with the received signal. The broadcast signals from the fixed node N1 at 101 and the unknown N3 node at 103 are received in the fixed node N2, which is operable to compare the phase of the two burst signals received and determine the position of the unknown node N3.

Because the phase difference is used to determine the difference in d1+d2 and d1+d3, the phase can be used to determine the position of the unknown node to one of two positions on a plane having the known difference between d2 and d3, as shown at 103 and 104 in FIG. 1. Although the three nodes 101, 102, and 103 form a plane, the plane cannot be determined using the method described above alone. The position of the unknown node 103 can be found to be in one of two positions 103 and 104 on the plane if the plane is already known, such as knowing that all three nodes are on the ground or on the floor of a single-story factory. In another example where the plane is not known, the unknown node may be anywhere along a circle having its center at the point where d1 and d2 meet in FIG. 1, such as on different locations of different floors in a multi-story building.

Figures 2, 3:
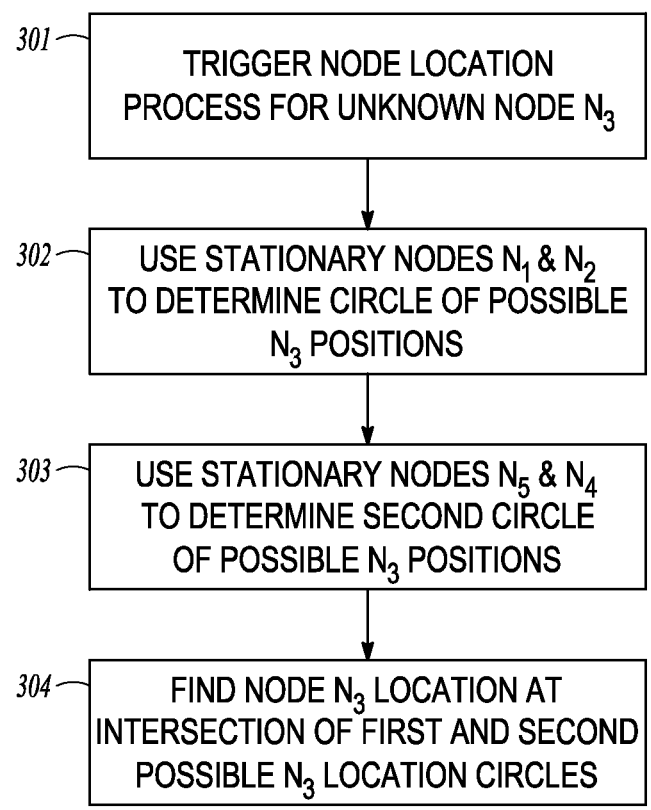
FIG. 2 illustrates equations used to determine the position of a movable node in a wireless network environment, consistent with an example embodiment of the invention.
FIG. 3 is a flowchart illustrating a method of finding the location of an unknown node in three dimensions by repeating a process in multiple planes, consistent with an example embodiment of the invention.

FIG. 2 shows a group of equations that can be used to determine the position of an unknown node such as N3 of FIG. 1, consistent with an example embodiment of the invention. Here, a variety of measurements are taken, denoted A, B, and D, and are used to solve the given equations for the distances d1, d2, and d3 as reflected in FIG. 1.

In this example, the N1 node makes a transmission to N3, which synchronizes with the phase of N1's transmission as previously described and sends a signal in phase with the received signal to N2. N2 is also able to either directly receive the same signal sent to N3, or receive a separate signal from N1 in phase with the signal N1 sent to N2, and to compare the phases of the signals from N1 and N2. This enables the node N2 to calculate a difference in path lengths between the distance from N1 to N2 (or d1+d2) and N1 to N3 to N2 (or d1+d3), plus some integer multiple of the signal's wavelength. This is reflected by the equation for A at 201, which reduces to the difference between distances d2 and d3.

A similar series of transmissions starts with N1 sending a signal to N2, which relays an in-phase signal to N3. A transmission from N1 to N3 enables N3 to compare phases of the received signals just as N2 did to derive the previous equation, resulting in the equation for B at 202. Here, the difference between the N1 to N2 to N3 path and the N1 to N3 path reduces to d2+d3, as also reflected at 202.

The distance D is known because the locations of nodes N1 and N2 are known, and can be used to solve for either d1 or d2 if the other distance is known, as shown at 203. Combination of the reduced equations for A at 201 and B at 202 is shown at 204, which reflects that two times d2 is equal to A plus B. Because A and B are known, the value of d2 can be calculated as shown at 205, and substituted back into equations 201-203 to find d1 and d3 as well.

The end result of these calculations is derivation of the distances d1, d2, and d3, which indicate the position of the node N3 relative to nodes N1 and N2 having known positions. If the three nodes are in the same plane, such as all located within the same floor of a factory building or hospital, the location of N3 can be determined to be one of two positions, as reflected in FIG. 1. If the plane defined by nodes N1, N2, and N3 is not known, the location of N3 is determined to be at any point having distance d1 from N1 and d2 from n2, which forms a circle having the line linking N1 and N2 at its center.

Repetition of the above process using the same unknown node and another pair of known nodes will result in another set of possible solutions, such that the intersection of the two solutions will indicate the actual location of the unknown node, making position location in two or three dimensions possible using methods such as that described above.

FIG. 3 is a flowchart, illustrating a method of finding the location of an unknown node in three dimensions, consistent with an example embodiment of the invention. At 301, some event triggers a node location process to determine the physical location of a node N3 in a network such as a wireless mesh network. The trigger event is in some embodiments a user-initiated query, such as a query regarding the location of a particular piece of equipment physically associated with the node N3, and in other examples is initiated by a node controller system periodically or when a node in the network appears to have an unknown location or to have moved.

The process described above with respect to FIG. 2 is then performed at 302, using nodes N1 and N2 having known locations to determine the location of node N3 as being some point on a circle centered about the axis linking N1 and N2 with its radius and position defined by the determined distances d1 and d3.

Because the exact physical location of the node can't be determined using this pair of nodes without further information regarding the unknown node's position, the process is repeated using another pair of nodes having known locations to derive another circle of possible locations for the unknown node 303. In the example at 303, two additional nodes N4 and N5 are used to determine another circle of possible node locations.

The unknown node location solutions found at 302 and 303 form two circles that will desirably intersect at only one point, resulting in a single well-defined node location as shown at 304. To increase the likelihood of the solution circles having a single, clearly defined point of intersection, the nodes N4 and N5 may be chosen not to be particularly near N1 and N2, and chosen so that the line connecting nodes N1 and N2 is not parallel to or is largely orthogonal to the line connecting nodes N4 and N5. This results in the two solution circles centered about the lines connecting the nodes N1-N2 and N4-N5 being in planes that are orthogonal rather than parallel to one another, to reduce the possibility of appearance of multiple intersections between the solution circles. In an extreme example, if the nodes N1-N2 and N1-N4 are used to find two solution circles, the solution circles will intersect at two points, leaving some potential ambiguity as to the unknown node's physical location.

In some further embodiments, the wavelength of the received signal is short enough that the phase of the signal received at receiving nodes repeats several times within the possible realm of locations of the unknown node. Each location process such as described in conjunction with FIG. 2 therefore provides a series of possible solutions, such that additional information is needed to determine the unknown node's position. To solve this, the process is repeated multiple times (such as three times) at frequencies relatively near one another, such that the solution series from the three repetitions of the location process overlap at only one solution point within a reasonable solution space.

The examples presented here illustrate how passing signals from node to node in phase with an originating node can be used to determine the position of an unknown node. The approach described herein has a variety of advantages over systems currently in use, such as not needing complicated and expensive Global Positioning System hardware or carefully synchronized clocks distributed between nodes. Although the example above is presented in the context of a ZigBee mesh network, other mesh networks such as DigiMesh and non-mesh networks such as Wi-Fi and wireless cellular networks can also use the methods described herein to determine the position of a mobile node in the network using two or more other nodes having known locations.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the example embodiments of the invention described herein. It is intended that this invention be limited only by the claims, and the full scope of equivalents thereof.

What is claimed is:

1. A method of determining the physical position of an unknown node in a wireless network, comprising:
   sending a first signal from a first transmitting reference node having a known position to a first receiving reference node having a known position and the unknown node, the first transmitting reference node and the first receiving reference node forming a first pair of reference nodes;
   receiving the first signal in the unknown node and sending a second signal from the unknown node to the first receiving reference node in phase with the first signal;
   receiving the first signal and the second signal in the first receiving reference node and comparing the phase of the received first and second signals;
   sending a third signal from a second transmitting reference node having a known position, different from the first transmitting reference node, to a second receiving reference node having a known position, different from the first receiving reference node, and the unknown node, the second transmitting reference node and the second receiving reference node forming a second pair of reference nodes;
   receiving the third signal in the unknown node and sending a fourth signal from the unknown node to the second receiving reference node in phase with the third signal;
   receiving the third signal and the fourth signal in the second receiving reference node and comparing the phase of the received third signal and the received fourth signal;
   determining the position of the unknown node based on the phase difference between the received first and second signals and on the phase difference between the received third and fourth signals;
   wherein the first transmitting reference node, the first receiving reference node, the second transmitting reference node, and the second receiving reference node are positioned such that a line between the first transmitting reference node and the first receiving reference node is orthogonal to a line between the second transmitting reference node and the second receiving reference node;
   wherein the wireless network is a mesh network.

2. The method of determining the physical position of a movable node in a network of claim 1, wherein determining the position of the unknown node comprises determining the position as one of two points on a plane defined by the first transmitting reference node, the first receiving reference node and the unknown node.

3. The method of determining the physical position of a movable node in a network of claim 1, further comprising repeating the method using two or more signal frequencies to resolve position ambiguity where signal wavelength is small relative to distances between nodes.

4. The method of determining the physical position of a movable node in a network of claim 1, wherein the network nodes comprise at least one of a Zigbee or a DigiMesh.

5. The method of determining the physical position of a movable node in a network of claim 1, wherein one or more of the first transmitting reference node and first receiving reference node comprise a mobile or unknown node whose location has already been determined.

6. A wireless network, comprising:
   a first transmitting reference node having known positions and a first receiving reference node having known positions and forming a first pair of reference nodes;
   a second transmitting reference node having known positions and a second receiving reference node having known positions and forming a second pair of reference nodes, wherein the first transmitting reference node is operable to send a first signal; and
   an unknown node operable to receive the first signal from the first transmitting reference node and send a second signal to the first receiving reference node in phase with the first signal;
   wherein the second transmitting reference node is operable to send a third signal;
   wherein the unknown node is operable to receive the third signal from the second transmitting reference node and send a fourth signal to the second receiving reference node in phase with the third signal;
   wherein the first receiving reference node is operable to receive and compare the phase of the first signal and second signal;
   wherein the second receiving reference node is operable to receive and compare the phase of the third signal and the fourth signal;
   wherein the position of the unknown node is determined based on the phase difference between the received first and second signals and on the phase difference between the received third and fourth signals;
   wherein the first transmitting reference node, the first receiving reference node, the second transmitting reference node, and the second receiving reference node are positioned such that a line between the first transmitting reference node and the first receiving reference node is orthogonal to a line between the second transmitting reference node and the second receiving reference node;
   wherein the wireless network is a mesh network.

7. The wireless network of claim 6, wherein determining the position of the unknown node comprises determining the position as one of two points on a plane defined by the first transmitting reference node, the first receiving reference node and the unknown node.

8. The wireless network of claim 6, the second reference node further operable to receive and compare signal phases using two or more signal frequencies to resolve position ambiguity where signal wavelength is small relative to distances between nodes.

9. The wireless network of claim 6, wherein the network nodes comprise at least one of a Zigbee or a DigiMesh.

10. The wireless network of claim 6, wherein one or more of the first transmitting reference node and the first receiving reference node comprise a mobile or unknown node whose location has already been determined.

* * * * *